United States Patent
Qin

(10) Patent No.: US 11,498,003 B2
(45) Date of Patent: Nov. 15, 2022

(54) IMAGE RENDERING METHOD, DEVICE, AND STORAGE MEDIUM

(71) Applicant: TENCENT TECHNOLOGY (SHENZHEN) COMPANY LIMITED, Guangdong (CN)

(72) Inventor: Yang Qin, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/178,437

(22) Filed: Feb. 18, 2021

(65) Prior Publication Data

US 2021/0170278 A1    Jun. 10, 2021

Related U.S. Application Data

(63) Continuation of application No. PCT/CN2019/120729, filed on Nov. 25, 2019.

(30) Foreign Application Priority Data

Dec. 7, 2018   (CN) .......................... 201811497482.0

(51) Int. Cl.
*A63F 13/57* (2014.01)
*G06T 15/00* (2011.01)
(Continued)

(52) U.S. Cl.
CPC .............. *A63F 13/56* (2014.09); *A63F 13/57* (2014.09); *G06T 13/60* (2013.01); *G06T 15/005* (2013.01)

(58) Field of Classification Search
CPC ......... A63F 13/56; A63F 13/57; G06V 13/60; G06V 15/005; G06T 13/60; G06T 15/005;
(Continued)

(56) References Cited

U.S. PATENT DOCUMENTS 6,520,861 B2 *   2/2003   Shoji ....................... A63F 13/65
                                                               472/65
6,639,591 B2 *  10/2003   Shoji ....................... A63F 13/65
                                                              345/418
(Continued)

FOREIGN PATENT DOCUMENTS

CN          105912234 A       8/2016
CN          105913471 A       8/2016
CN          109598777 A       4/2019

OTHER PUBLICATIONS

International Search Report issued in International Application No. PCT/CN2019/120729, citing documents AA and AO-AQ therein, dated Feb. 21, 2020, with English abstract, 5 pages total.

(Continued)

*Primary Examiner* — David L Lewis
*Assistant Examiner* — Matthew D Hoel
(74) *Attorney, Agent, or Firm* — ArentFox Schiff LLP

(57) ABSTRACT

Aspects of this disclosure provide a method where a normal map corresponding to a target water body region where a dynamic object is located in a next image frame can be acquired based on a water wave map corresponding to the target water body region where the dynamic object is located in a current image frame, and a water wave effect on the target water body region where the dynamic object is located in the next image frame is rendered according to the normal map. On the one hand, through iterative rendering frame by frame, a realistic water wave animation effect can be simulated to make the water surface interaction very natural, providing users with immersive experience. Further, because the water wave rendering is performed only on the target water body region, the complexity is lowered, and the calculation amount is reduced, to better adapt to a mobile terminal application.

20 Claims, 6 Drawing Sheets

(51) Int. Cl.
   *G06T 13/60* (2011.01)
   *A63F 13/56* (2014.01)
(58) Field of Classification Search
   CPC . G06T 2210/24; G06T 2210/56; G06T 13/20;
   G06T 13/80; G06T 15/04; G06T 15/06;
   G06T 15/08; G06T 17/05; G06T 17/20;
   G06T 17/30; G06T 17/221; G06T 17/36
   See application file for complete search history.

(56) References Cited

U.S. PATENT DOCUMENTS

| | | | | |
|---|---|---|---|---|
| 6,664,965 | B1* | 12/2003 | Yamamoto | G06T 15/005 345/473 |
| 6,980,207 | B2* | 12/2005 | Yamamoto | G06T 15/005 345/473 |
| 7,164,424 | B2* | 1/2007 | Liang | H04N 5/262 345/473 |
| 7,471,297 | B2* | 12/2008 | Yamamoto | A63F 13/837 345/475 |
| 7,557,808 | B2* | 7/2009 | Yamamoto | A63F 13/10 463/2 |
| 8,204,725 | B1* | 6/2012 | Thuerey | G06T 13/60 345/473 |
| 8,232,999 | B2* | 7/2012 | Gornowicz | G06T 13/60 345/475 |
| 9,138,649 | B2* | 9/2015 | Matsushita | A63F 13/10 |
| 9,811,941 | B1* | 11/2017 | Hankins | G06T 13/60 |
| 9,940,689 | B2* | 4/2018 | Dunn | G06T 11/40 |
| 9,995,812 | B2* | 6/2018 | Topgaard | G01R 33/56341 |
| 10,073,026 | B2* | 9/2018 | Curry | G01N 15/1404 |
| 10,173,138 | B2* | 1/2019 | Sato | A63F 13/803 |
| 10,176,586 | B2* | 1/2019 | Hamanaka | A63F 13/211 |
| 10,245,511 | B2* | 4/2019 | Nanami | A63F 13/57 |
| 10,272,337 | B2* | 4/2019 | Shimizu | A63F 13/525 |
| 10,307,679 | B2* | 6/2019 | Noto | A63F 13/525 |
| 10,537,805 | B2* | 1/2020 | Desjardins | A63F 13/52 |
| 10,593,110 | B2* | 3/2020 | Luo | A63F 13/56 |
| 10,617,954 | B2* | 4/2020 | Sato | G06T 19/20 |
| 10,649,057 | B2* | 5/2020 | Topgaard | G01R 33/56308 |
| 10,744,410 | B2* | 8/2020 | Hayami | A63F 13/57 |
| 10,839,587 | B2* | 11/2020 | Jie | G06T 1/60 |
| 10,950,010 | B2* | 3/2021 | Pease | G06T 11/001 |
| 10,970,843 | B1* | 4/2021 | Olsen | H04N 21/4316 |
| 11,010,509 | B2* | 5/2021 | Jeschke | G06T 13/60 |
| 11,062,513 | B2* | 7/2021 | Zhang | G06T 17/20 |
| 11,122,307 | B2* | 9/2021 | Wu | H04N 21/4126 |
| 11,217,002 | B2* | 1/2022 | Lesser | G06T 17/20 |
| 2002/0032053 | A1* | 3/2002 | Shoji | G09B 29/10 463/30 |
| 2002/0091005 | A1* | 7/2002 | Shoji | A63F 13/65 472/65 |
| 2004/0104912 | A1* | 6/2004 | Yamamoto | G06T 17/00 345/473 |
| 2006/0022974 | A1* | 2/2006 | Yamamoto | G06T 13/80 345/419 |
| 2006/0177122 | A1* | 8/2006 | Yasue | G06T 13/60 382/154 |
| 2008/0068387 | A1* | 3/2008 | Yamamoto | A63F 13/52 345/473 |
| 2010/0045669 | A1 | 2/2010 | Johnson | |
| 2011/0319164 | A1* | 12/2011 | Matsushita | G06T 13/60 463/32 |
| 2016/0275643 | A1* | 9/2016 | Sato | G06T 19/20 |
| 2017/0124679 | A1* | 5/2017 | Dunn | G06T 1/20 |
| 2017/0161909 | A1* | 6/2017 | Hamanaka | G06T 7/20 |
| 2017/0239572 | A1* | 8/2017 | Nanami | A63F 13/57 |
| 2017/0239573 | A1* | 8/2017 | Shimizu | A63F 13/57 |
| 2017/0239574 | A1* | 8/2017 | Noto | A63F 13/525 |
| 2018/0005426 | A1* | 1/2018 | Desjardins | A63F 13/56 |
| 2018/0012403 | A1* | 1/2018 | Luo | A63F 13/355 |
| 2018/0361245 | A1* | 12/2018 | Sato | G06T 19/20 |
| 2019/0035134 | A1* | 1/2019 | Jie | A63F 13/52 |
| 2019/0060754 | A1* | 2/2019 | Hayami | A63F 13/57 |
| 2019/0297360 | A1* | 9/2019 | Wu | H04N 21/2385 |
| 2019/0299097 | A1* | 10/2019 | Had | A63F 13/52 |
| 2020/0043230 | A1* | 2/2020 | Zhang | G06T 11/60 |
| 2020/0226799 | A1* | 7/2020 | Pease | G06T 11/001 |
| 2020/0402288 | A1* | 12/2020 | Yerli | H04W 4/029 |
| 2021/0170278 | A1* | 6/2021 | Qin | A63F 13/56 |
| 2021/0402287 | A1* | 12/2021 | Liu | A63F 13/537 |
| 2022/0008826 | A1* | 1/2022 | Gomer | A63F 13/57 |
| 2022/0134222 | A1* | 5/2022 | Lebaredian | A63F 13/56 463/31 |

OTHER PUBLICATIONS

Written Opinion of the International Searching Authority issued in International Application No. PCT/CN2019/120729, dated Feb. 21, 2020, 4 pages.
European Search Report issued in Application No. 19892415.1 dated Nov. 12, 2021 (8 pages).
Chen, "Fast, interactive water wave simulation in gpu for games," Nanyang Technological University, 2010 (98 pages).
Jensen et al., "Deep Water Animation and Rendering", Sep. 26, 2001 (13 pages).
Yuksel et al., "Wave Particles", Computer Supported Cooperative Work, ACM, Jul. 29, 2007 (8 pages).
Darles et al., "A Survey of Ocean Simulation and Rendering Techniques in Computer Graphics," Cornell University Library, Sep. 29, 2011 (17 pages).

* cited by examiner

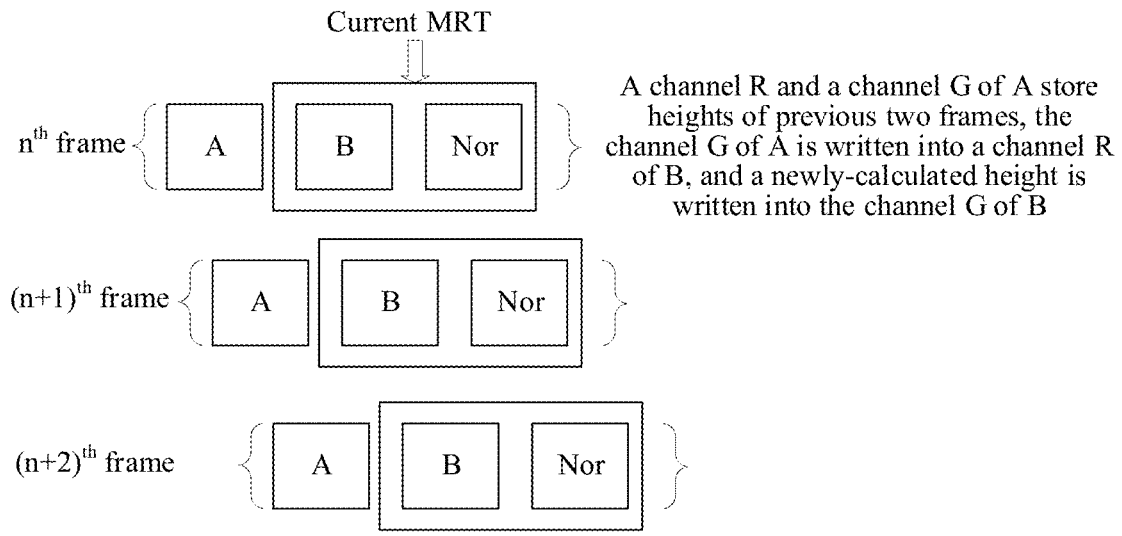

FIG. 3

```
┌─────────────────────────────────────────────┐
│ Perform attenuation processing on the water wave map │
│ corresponding to the target water body region where the │  S401
│ dynamic object is located in the current image frame │
│ according to a water wave injection displacement and a │
│ water wave diffusion attenuation matrix corresponding to │
│ the dynamic object to obtain an attenuated water wave │
│ map in a case that the dynamic object moves in water │
└─────────────────────────────────────────────┘
                      │
                      ▼
┌─────────────────────────────────────────────┐
│ Offset the attenuated water wave map in a direction │  S402
│ opposite to a movement direction of the dynamic object │
│ according to a location offset of the dynamic object to │
│ obtain an offset water wave map │
└─────────────────────────────────────────────┘
```

FIG. 4

IMAGE RENDERING METHOD, DEVICE, AND STORAGE MEDIUM

RELATED APPLICATION

This application is a continuation of International Application No. PCT/CN2019/120729, filed on Nov. 25, 2019, which claims priority to Chinese Patent Application No. 201811497482.0, entitled "IMAGE RENDERING METHOD AND APPARATUS, DEVICE, AND STORAGE MEDIUM" and filed on Dec. 7, 2018. The entire disclosures of the prior applications are hereby incorporated by reference in their entirety.

FIELD OF THE TECHNOLOGY

This disclosure relates to the field of computer technologies, and in particular, to an image rendering method, a device, and a storage medium.

BACKGROUND OF THE DISCLOSURE

With the development of computer graphics technologies, the realization of virtual scenes has been increasingly applied. Users often pay more attention to being able to feel more realistic interaction effects in the virtual scenes to enjoy immersive experience. For example, in a game application, a game player often pays attention to interaction effects of a dynamic game object and a game scene displayed in a game interface. For example, when the game player is swimming and walking in water, if there is a more realistic water surface interaction effect that the water fluctuates with the swimming and walking of the game player, the game player may have more fun from the game.

Due to the limitations of mobile terminal hardware performance and the complexity of technical implementation, currently, the water surface interaction is ignored in most commercially available mobile games, that is, the water surface is static. When a dynamic game object, such as a game player in the game, is moving in water, there is no interaction effect on the water surface, which makes it impossible for the game player to gain an immersive experience of the game scene.

However, some mobile games also attempt to implement a water surface interaction solution, but it produces a certain disturbance to a water surface by binding special effects near a dynamic game object. Its essence is to hang a special effect on the dynamic game object, and the special effect can disturb the water surface. However, when the dynamic game object turns to move, this special effect can swing like a tail behind the dynamic game object, making the entire game picture look very unnatural, which actually affects the immersive experience of users.

SUMMARY

Aspects of this disclosure can provide an image rendering method where a normal map corresponding to a target water body region where a dynamic object is located in a next image frame can be acquired based on a water wave map corresponding to the target water body region where the dynamic object is located in an image frame, and a water wave effect on the target water body region is rendered based on the normal map. Compared with a special effect pendant, the method provides users with a more realistic water surface interaction effect to improve immersive experience. Correspondingly, this disclosure further provides an image rendering apparatus, a device, a non-transitory computer-readable storage medium, and a computer program product.

A first aspect of this disclosure provides an image rendering method that is applicable to a processing device. The method can include acquiring a water wave map corresponding to a target water body region where a dynamic object is located in a current image frame. The method can further include acquiring a normal map corresponding to the target water body region where the dynamic object is located in a next image frame based on the water wave map corresponding to the target water body region where the dynamic object is located in the current image frame. Additionally, the method can include rendering a water wave effect on the target water body region where the dynamic object is located in the next image frame according to the normal map corresponding to the target water body region where the dynamic object is located in the next image frame.

A second aspect of this disclosure provides an image rendering apparatus. The apparatus can include an acquiring module that is configured to acquire a water wave map corresponding to a target water body region where a dynamic object is located in a current image frame. The apparatus can further include an iteration module that is configured to acquire a normal map corresponding to the target water body region where the dynamic object is located in a next image frame according to the water wave map corresponding to the target water body region where the dynamic object is located in the current image frame. Further, the apparatus can include a rendering module that is configured to render a water wave effect on the target water body region where the dynamic object is located in the next image frame according to the normal map corresponding to the target water body region where the dynamic object is located in the next image frame.

A third aspect of this disclosure provides a processing device, including a processor and a memory that is configured to store program code and transmit the program code to the processor. The processor being configured to perform the steps in the image rendering method based on the foregoing first aspect according to instructions in the program code.

A fourth aspect of this disclosure can provide a non-transitory computer-readable storage medium that is configured to store program code that, when executed by a processor, cause the processor to implement the image rendering method according to the foregoing first aspect.

A fifth aspect of this disclosure provides a computer program product including instructions that, when run on a computer, enabling the computer to perform the image rendering method according to the foregoing first aspect.

BRIEF DESCRIPTION OF THE DRAWINGS

Various exemplary embodiments of this disclosure that are proposed as examples will be described in detail with reference to the following figures, wherein like numerals reference like elements, and wherein:

FIG. 3 is a schematic diagram of a principle of acquiring a water wave map and a normal map of a next image frame based on a water wave map of a current image frame according to an embodiment of this disclosure.

FIG. 4 is a flowchart of an image rendering method according to an embodiment of this disclosure.

DESCRIPTION OF EMBODIMENTS

Figure 1:
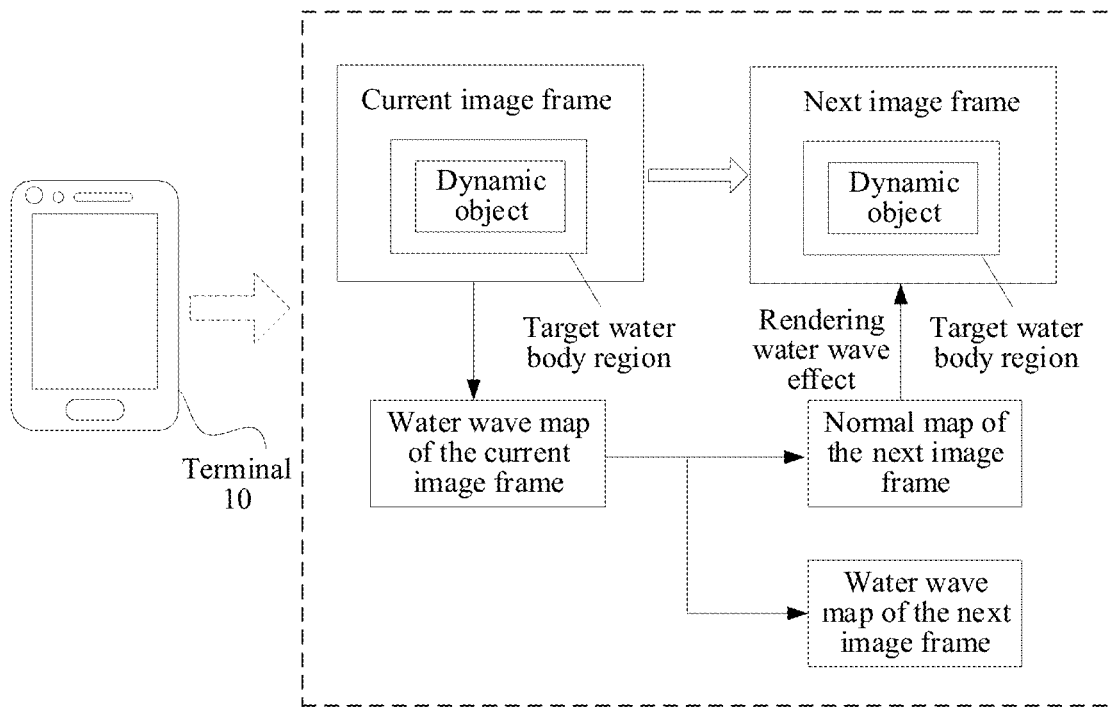
FIG. 1 is a diagram of a scenario architecture of an image rendering method according to an embodiment of this disclosure.

In the specification, claims, and accompanying drawings of this disclosure, the terms "first", "second", "third", "fourth", and so on are intended to distinguish between similar objects rather than describe a specific order or sequence. It is to be understood that the data termed in such a way are interchangeable in proper circumstances, so that the embodiments of this disclosure described herein can be implemented in orders other than the order illustrated or described herein. Moreover, the terms "include", "comprise" and any other variants thereof are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

For ease of understanding, technical terms used in this disclosure are first described.

Water surface rendering refers to a technology of drawing a water body in a video, including geometric representation, coloring, and animation of the water body. Drawing the water body is mainly to draw a water surface. Specifically, the water surface is divided into blocks, and the water surface is represented by using location information and normal information of vertexes of the blocks.

A water wave map specifically refers to a map formed by height displacement information of the vertexes of the blocks of the water surface.

A normal map specifically refers to a map formed by normal information of tangent planes of the water surface. For water surface rendering, the normal map records the normal information corresponding to the vertexes, which can represent unevenness of the vertexes of the blocks of the water surface, and a three-dimensional effect can be achieved based on the unevenness.

In view of the technical problem that the immersive experience of users is affected due to unnatural pictures caused by binding special effects to implement water surface interaction in the related art, this disclosure provides an image rendering method. The method considers water wave spread motion condition and can include acquiring a normal map corresponding to a target water body region where a dynamic object is located in a next image frame based on a water wave map corresponding to the target water body region where the dynamic object is located in a current image frame, and rendering a water wave effect on the target water body region in the next image frame based on the normal map. Through iterative rendering frame by frame, a realistic water wave animation effect can be simulated to make the water surface interaction very natural, providing users with immersive experience. On the other hand, because the water wave rendering is performed only on the target water body region, the complexity is lowered, and the calculation amount is reduced to better adapt to a mobile terminal application.

It is to be understood that the image rendering method provided in this disclosure is applicable to any processing device with an image processing capability. The processing device may be specifically a device including at least one of a graphics processing unit (GPU) and a central processing unit (CPU), for example, the processing device may be a terminal or a server. The terminal refers to user equipment with the image processing capability that is available at present, being researched and developed, or to be researched and developed in future, including, but not limited to, a smart phone, a tablet computer, a laptop personal computer, and a desktop personal computer that are available at present, being researched and developed, or to be researched and developed in future. The server refers to any device with the image processing capability providing computing services. During specific implementation, the processing device may be an independent terminal or server, or may be a cluster formed by terminals or servers.

The image rendering method in this disclosure may be stored in the processing device in a form of an application (APP). The processing device implements the image rendering method by executing the foregoing APP. The APP may be an independent APP, or may be a functional module, a plug-in, an applet, and the like integrated in other APPs. For ease of understanding, an example in which the executive body is a terminal is used to describe the specific implementation of the image rendering method below.

FIG. 1 is a diagram of a scenario architecture of an image rendering method. The scenario includes a terminal 10. The terminal 10 acquires a water wave map corresponding to a target water body region where a dynamic object is located in a current image frame, acquires a normal map corresponding to the target water body region where the dynamic object is located in a next image frame according to the water wave map corresponding to the target water body region where the dynamic object is located in the current image frame, and renders a water wave effect on the target water body region where the dynamic object is located in the next image frame according to the normal map corresponding to the target water body region where the dynamic object is located in the next image frame. Through iterative rendering frame by frame, a realistic water wave animation effect can be simulated to implement natural water surface rendering.

In a possible implementation, the terminal 10 may further acquire a water wave map corresponding to the target water body region where the dynamic object is located in the next image frame according to the water wave map corresponding to the target water body region where the dynamic object is located in the current image frame. The water wave map is used for acquiring a normal map corresponding to the target water body region where the dynamic object is located in a next-but-one image frame. An example in which the water wave map is also acquired is used only in FIG. 1, but this disclosure is not limited thereto.

Figure 2:
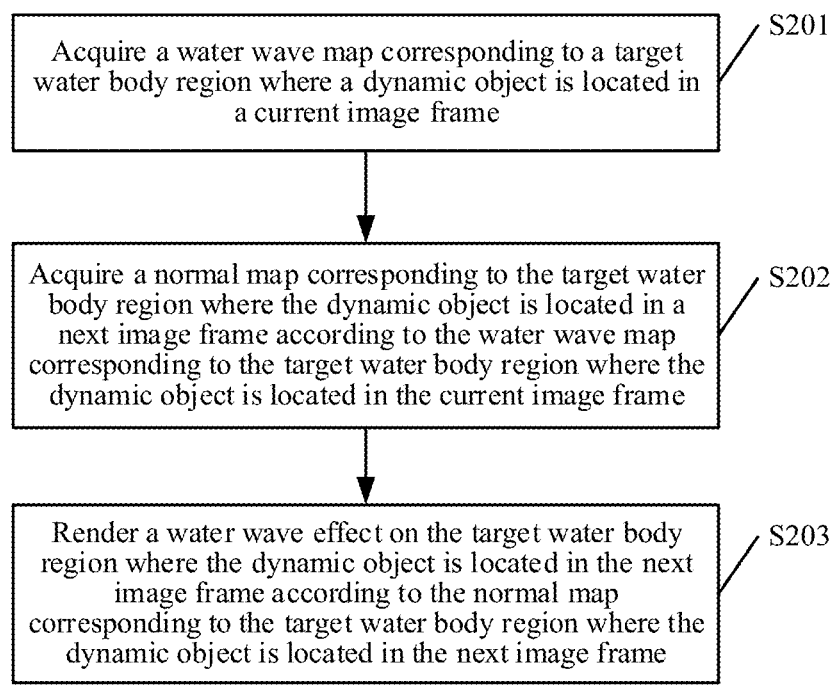
FIG. 2 is a flowchart of an image rendering method according to an embodiment of this disclosure.

To make the technical solutions of this disclosure clearer and easier to understand, the following describes the image rendering method provided in the embodiments of this disclosure in detail with reference to the accompanying drawings. FIG. 2 is a flowchart of an image rendering method. In this embodiment of this disclosure, the method is also applicable to a processing device, and the processing device may be a server or a terminal. The process of the method is similar to the following, and only an example in which the method is applied to a terminal is used for description herein. The method can include the following steps.

In step S201 the method can acquire a water wave map corresponding to a target water body region where a dynamic object is located in a current image frame. The image rendering method in this embodiment is applicable to a plurality of scenarios. For example, a relatively typical scenario is to render a water wave animation effect for a water surface in a game scenario. In this scenario, the image frame is an image frame in the game application, and the dynamic object is a movable game role object in the game application, for example, a game player. A realistic water wave animation effect can be rendered for movement dynamics of the game player in water by using the image rendering method, so that the immersive feeling of the game player can be improved.

The target water body region where a dynamic object is located is a partial region of the entire water surface. The shape and size of the partial region may be set according to requirements, for example, the shape of the partial region may be rectangular, or may be fan-shaped or circular. For ease of understanding, this embodiment of this disclosure provides several implementations for acquiring the target water body region. Specifically, one implementation is that the terminal may acquire an image location of the dynamic object in an image frame, and acquire a rectangular region where the dynamic object is located in the image frame as the target water body region by using the image location as a central location of the target water body region where the dynamic object is located and using a preset width and height as a width and height of the target water body region.

Another implementation is that the terminal may acquire an image location of the dynamic object in an image frame, and acquire a fan-shaped region where the dynamic object is located in the image frame as the target water body region by using the image location as a vertex location of the target water body region where the dynamic object is located and using a preset radius and a preset angle as a fan-shaped radius and a fan-shaped angle of the target water body region.

Because the water wave generally spreads from a center point to a neighboring region, when the water wave spreads to a distance, the water wave effect is not significant, and a game player usually does not pay attention to the water wave effect in the distance. Therefore, in this embodiment, the needs of the game application can be met by performing the water surface rendering on the target water body region where the dynamic object is located in the image frame. More importantly, only rendering the partial region of the water surface can greatly reduce the calculation amount.

In step S202, the method can acquire a normal map corresponding to the target water body region where the dynamic object is located in a next image frame according to the water wave map corresponding to the target water body region where the dynamic object is located in the current image frame. In this embodiment, the terminal acquires the normal map corresponding to the target water body region where the dynamic object is located in the next image frame according to the water wave map corresponding to the target water body region where the dynamic object is located in the current image frame, the normal map being used for rendering the water wave effect of the target water body region.

In a possible implementation, the terminal may acquire two maps corresponding to a target water body region where a dynamic object is located in a next image frame according to the water wave map corresponding to the target water body region where the dynamic object is located in the current image frame. The first map is a normal map, and the second map is a water wave map. The water wave map is used for calculating a normal map of a next-but-one image frame or is used for calculating a water wave map and a normal map of a next-but-one image frame, so as to implement iterative updating frame by frame. In another possible implementation, the water wave map may further be acquired when a next-but-one image frame is acquired. This embodiment of this disclosure does not limit the acquisition timing of the water wave map.

For any image frame, a water wave map corresponding to a target water body region in the image frame includes water surface height displacements of the image frame and a previous frame thereof, and a normal map corresponding to the target water body region includes water surface height displacement differences respectively between each water surface vertex and two vertexes neighboring to the each water surface vertex in the current image frame according to the water wave map. Based on this, the terminal may acquire the normal map corresponding to the target water body region where the dynamic object is located in the next image frame through the following steps.

In step 1, the terminal can read water surface height information from the water wave map corresponding to the target water body region where the dynamic object is located in the current image frame, the water surface height information including water surface height displacements respectively corresponding to the current image frame and a previous frame thereof.

In step 2, the terminal can acquire a water wave map corresponding to the target water body region where the dynamic object is located in the next image frame according to the water surface height information.

In step 3, the terminal can acquire the normal map corresponding to the target water body region where the dynamic object is located in the next image frame according to the water wave map corresponding to the target water body region where the dynamic object is located in the next image frame.

In the foregoing steps, the terminal may acquire the water wave map corresponding to the target water body region where the dynamic object is located in the next image frame in Step 2, and uses the water wave map as a basis for acquiring the normal map and as a basis for acquiring a normal map corresponding to the target water body region where the dynamic object is located in a next-but-one image frame. The terminal may alternatively acquire the water wave map of the next image frame when acquiring the normal map corresponding to a next-but-one image frame, which is not limited in this embodiment of this disclosure.

For Step 2, considering water wave fluctuation, this embodiment provides a specific implementation of acquiring the water wave map of the next image frame based on a wave equation. Specifically, the terminal acquires, by using the water surface height information as a wave equation parameter, a water surface height displacement corresponding to the next image frame according to a wave equation with damping and the wave equation parameter, and generates the water wave map corresponding to the target water body region where the dynamic object is located in the next image frame according to the water surface height displacement corresponding to the current image frame and the water surface height displacement corresponding to the next image frame.

In this embodiment, the wave equation with damping is specifically:

$$\frac{\partial^2 h}{\partial t^2} - k\frac{\partial h}{\partial t} = c^2\left(\frac{\partial^2 h}{\partial x^2} + \frac{\partial^2 h}{\partial y^2}\right), \quad (1)$$

where k represents a damping coefficient; c represents a water wave velocity; t represents a time; and x, y respectively represent horizontal coordinates and vertical coordinates of a location in the image frame.

After the wave equation parameter is substituted into the foregoing wave equation with damping, a finite-difference method can be used for approximate solution. Specifically, reference may be made to the following formula:

$$\frac{\partial h}{\partial t} = h(\dot{t}, x, y) = \frac{h(t+\Delta t, x, y) - h(t, x, y)}{\Delta t} \quad (2)$$

$$\frac{\partial^2 h}{\partial t^2} = h(\ddot{t}, x, y) = \frac{h(t, x, y) - h(t-\Delta t, x, y)}{\Delta t} =$$

$$\frac{h(t+\Delta t, x, y) - 2h(t, x, y) - h(t-\Delta t, x, y)}{\Delta t^2}$$

$$\frac{\partial^2 h}{\partial x^2} = h(t, \ddot{x}, y) = \frac{h(t, x+\Delta x, y) - 2h(t, x, y) - h(t, x-\Delta x, y)}{\Delta x^2}$$

$$\frac{\partial^2 h}{\partial y^2} = h(t, x, \ddot{y}) = \frac{h(t, x, y+\Delta y) - 2h(t, x, y) - h(t, x, y-\Delta y)}{\Delta y^2}$$

Formula (2) are substituted into formula (1) to obtain:

$$h(t+\Delta t, x, y) = \quad (3)$$

$$h(t, x, y) + (1 - k\Delta t)(h(t, x, y) - h(t-\Delta t, x, y)) + \frac{\Delta t^2 c^2}{\Delta x^2}(4h(t, x, y) -$$

$$h(t, x+1, y) - h(t, x-1, y) - h(t, x, y+1) - h(t, x, y-1)),$$

where h(t+Δt,x,y) represents a height displacement of the next image frame to be solved at (x,y); h(t,x,y) represents a height displacement of the current image frame at (x,y); h(t−Δt,x,y) represents a height displacement of a previous image frame at (x,y); and h(t,x+1,y), h(t,x−1,y), h(t,x,y+1), and h(t,x,y−1) represent height displacements of four vertexes around (x,y) in the current image frame.

For Step 3, this embodiment of this disclosure provides two implementations. One implementation is to acquire water surface height displacement differences respectively between each water surface vertex and an upper vertex and a right vertex that are neighboring to the each water surface vertex in the next image frame according to the water wave map corresponding to the target water body region where the dynamic object is located in the next image frame, and acquire the normal map corresponding to the target water body region where the dynamic object is located in the next image frame according to the water surface height displacement differences.

The other implementation is to acquire water surface height displacement differences respectively between each water surface vertex and a left vertex and a lower vertex that are neighboring to the each water surface vertex in the next image frame according to the water wave map corresponding to the target water body region where the dynamic object is located in the next image frame, and acquire the normal map corresponding to the target water body region where the dynamic object is located in the next image frame according to the water surface height displacement differences.

In this embodiment, the water wave map and the normal map use two color rendering map formats, for example, an RGHalf format. The format specifically refers to storing image information by using a channel R and a channel G. Specifically, for the water wave map, the water surface height displacements of the current image frame and a previous image frame thereof are stored respectively by using the channel R and the channel G, and for the normal map, the water surface height displacement differences respectively between each water surface vertex and two vertexes neighboring to the each water surface vertex are stored respectively by using the channel R and the channel G, which can reduce the calculation amount of rendering.

The process of acquiring a water wave map and a normal map of a next image frame based on a water wave map of a current image frame is exemplarily described below with reference to FIG. 3. As shown in FIG. 3, three render textures (RT) are provided, which are respectively marked as A, B, and Nor. Nor represents the normal map. In this embodiment, the three render textures adopt the RGHalf format. the render texture A and the render texture B are respectively used for storing the water wave maps of two neighboring image frames, and the render texture Nor is used for storing the normal map of the next image frame in the two neighboring image frames. For each image frame, the input is the water wave map of the current image frame, and the output of multiple render targets (MRT) is the water wave map and the normal map of the next image frame.

For an $n^{th}$ frame, n being a positive integer, the render texture A stores the water wave map of the current image frame. Specifically, the channel R stores a water surface height displacement of an $(n-1)^{th}$ frame, and the channel G stores a water surface height displacement of the $n^{th}$ frame. The render texture B stores a water wave map of an $(n+1)^{th}$ frame, and the water wave map of the $(n+1)^{th}$ frame includes the water surface height displacement of the $n^{th}$ frame and a water surface height displacement of the $(n+1)^{th}$ frame. In this case, a value of the channel G of the render texture A may be written into the channel R of the render texture B, and the water surface height displacement of the $(n+1)^{th}$ frame calculated based on the water surface height displacements in the channel R and the channel G in the render texture A is written into the channel G of the render texture B. The render texture Nor stores a normal map of the $(n+1)^{th}$ frame, and the normal map includes water surface height displacement differences respectively between each water surface vertex and an upper vertex and a right vertex that are neighboring to the each water surface vertex in the $(n+1)^{th}$ frame. In this case, the water surface height displacement differences between the each water surface vertex and the upper vertex and the water surface height displacement differences between the each water surface vertex and the right vertex may be calculated based on the data in the channel G in the render texture B and respectively written into the channel R and the channel G of the render texture Nor.

Each time the water wave map and the normal map are updated, the two water wave maps are exchanged. For example, for an $(n+1)^{th}$ frame, the render texture A and the render texture B are exchanged based on the $n^{th}$ frame. In this case, for the $(n+1)^{th}$ frame, the input is the render texture B, and the output is the render texture A and the render texture Nor. The render texture B stores the water wave map of the $(n+1)^{th}$ frame, the channel R thereof stores the water surface height displacement of the $n^{th}$ frame, and the channel G thereof stores the water surface height displacement of the $(n+1)^{th}$ frame. Based on this, the water surface height displacement of the $(n+1)^{th}$ frame in the channel G is written into the channel R of the render texture A, and a water surface height displacement of an $(n+2)^{th}$ frame calculated based on the water surface height displacements of the $n^{th}$ frame and the $(n+1)^{th}$ frame is written into the channel G of the render texture A. In this case, a water wave map of the $(n+2)^{th}$ frame is generated in the render texture A, and water surface height displacement differences respectively between each water surface vertex and an upper vertex and a right vertex that are neighboring to the each water surface vertex may be calculated based on the water surface height displacement of the $(n+2)^{th}$ frame and respectively written into the channel R and the channel G of the render texture Nor, to form a normal map of the $(n+2)^{th}$ frame. The rest may be deduced by analogy, water wave maps and normal maps of an $(n+3)^{th}$ frame and an $(n+4)^{th}$ frame may be generated.

In step S203, the process can render a water wave effect on the target water body region where the dynamic object is located in the next image frame according to the normal map corresponding to the target water body region where the dynamic object is located in the next image frame. Because the normal map can represent an unevenness degree of water surface vertexes of the target water body region where the dynamic object is located, the terminal may render the water wave effect on the target water body region where the dynamic object is located based on the normal map. Specifically, the terminal renders the water wave effect on the target water body region where the dynamic object is located in the next image frame according to the normal map corresponding to the target water body region where the dynamic object is located in the next image frame. Through iterative rendering frame by frame, a realistic water wave animation effect can be simulated.

It can be learned from above that this embodiment of this disclosure provides an image rendering method. The method considers water wave spread motion condition and includes: acquiring a normal map corresponding to a target water body region where a dynamic object is located in a next image frame based on a water wave map corresponding to the target water body region where the dynamic object is located in a current image frame, and rendering a water wave effect on the target water body region in the next image frame based on the normal map. On the one hand, through iterative rendering frame by frame, a realistic water wave animation effect can be simulated to make the water surface interaction very natural, providing users with immersive experience. On the other hand, because the water wave rendering is performed only on the target water body region, the complexity is lowered, and the calculation amount is reduced, to better adapt to a mobile terminal application.

The embodiment shown in FIG. 2 mainly describes the iteration process of the water wave. When the dynamic object moves in water, in order to render a realistic water wave animation effect, it is also necessary to consider the process of continuously injecting a new water wave as the dynamic object moves in water, that is, the formation of the water wave includes not only the injection process of the water wave but also the iteration process of the water wave.

Next, an image rendering method including an injection process of new water wave is described with reference to FIG. 4. FIG. 4 is a flowchart of an image rendering method. The embodiment shown in FIG. 4 is obtained through improvement based on the embodiment shown in FIG. 2. The following describes only the differences between the embodiments shown in FIG. 4 and FIG. 2. The method includes the following steps.

In step S401, the method can perform attenuation processing on the water wave map corresponding to the target water body region where the dynamic object is located in the current image frame according to a water wave injection displacement and a water wave diffusion attenuation matrix corresponding to the dynamic object to obtain an attenuated water wave map in a case that the dynamic object moves in water. In this embodiment, the water wave injection produced when the dynamic object moves in water may be represented by using the water wave injection displacement and the water wave diffusion attenuation matrix. The water wave diffusion attenuation matrix may be represented by using a kernel, and the kernel may be used for describing a shape of the water wave injection, for example, the shape of the water wave injection may be a symmetrical structure, and the kernel is shown as follows:

$$0.0, 0.0, 0.0, 0.0, 0.0, 0.0, 0.5, 0.8, 0.5, 0.0, 0.0, 0.8,$$
$$1.0, 0.8, 0.0, 0.0, 0.5, 0.8, 0.5, 0.0, 0.0, 0.0, 0.0,$$
$$0.0, 0.0, \quad (4)$$

During specific implementation, the terminal may acquire the water wave injection displacement corresponding to the dynamic object according to at least one of an object attribute of the dynamic object or a type of movement that the dynamic object makes. An example in which the dynamic object is a game role object is used, the object attribute may include a gender, a weight, and the like of the game role object, and the type of movement that the dynamic object makes may be specifically stomping feet, lifting feet, and the like. In this case, the terminal acquires the water wave injection displacement corresponding to the game role object according to the gender and the weight of the game role object and the implemented type of movements such as stomping feet and lifting feet. The water wave injection displacements corresponding to different object attributes or different movement types may be different, and the water wave injection displacements corresponding to different object attributes and different movement types may also be different. For example, a water wave injection displacement produced by a female game role stomping in water is less than a water wave injection displacement produced by a male game role stomping in water.

After the water wave injection displacement and the water wave diffusion attenuation matrix are acquired, the terminal may perform the attenuation processing on the water wave map. Specifically, the terminal acquires a product of the water wave injection displacement and the water wave diffusion attenuation matrix corresponding to the dynamic object as an attenuation parameter matrix, and then superposes values in the attenuation parameter matrix to the water wave map corresponding to the target water body region where the dynamic object is located in the current image frame to obtain the attenuated water wave map. When the values in the attenuation parameter matrix are superposed to the water wave map corresponding to the current image frame, a center point of the attenuation parameter matrix may be matched with a center point of the water wave map first, and then the values of elements in the attenuation parameter matrix are superposed to corresponding vertexes of the water wave map based on the center point.

In step S402, the method can offset the attenuated water wave map in a direction opposite to a movement direction of the dynamic object according to a location offset of the dynamic object to obtain an offset water wave map. Because the attenuated water wave map uses the dynamic object as a center, if the water wave map is directly used for iterative rendering, the water wave always follows the role to move in the rendered next image frame. However, the real water wave does not follow the role to move, but lags behind the role. Based on this, this embodiment provides the manner of offsetting the attenuated water wave map in a direction opposite to a movement direction of the dynamic object to create a lag sense of the water wave, so as to simulate the realistic water wave effect.

Figure 5:
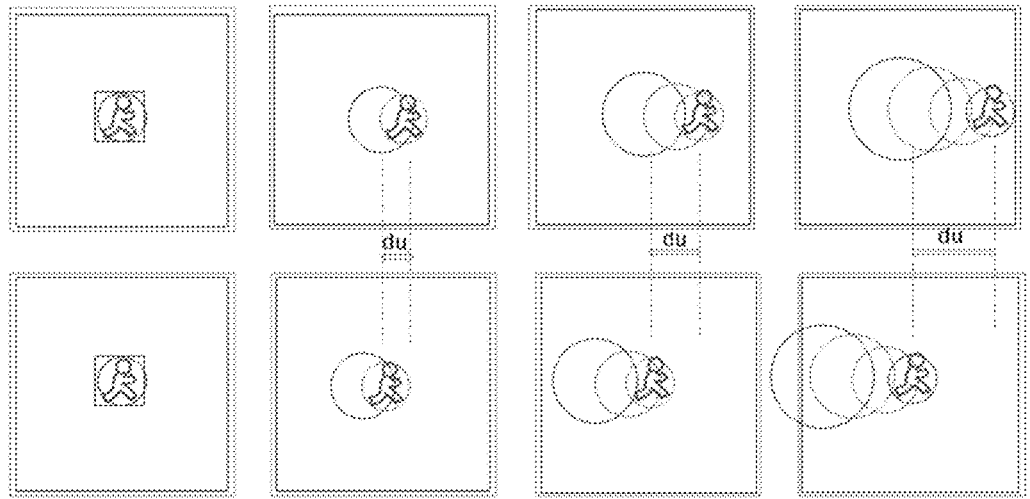
FIG. 5 is a schematic diagram of a water wave lag effect according to an embodiment of this disclosure.

The implementation principle of rendering the lag sense of the water wave is described below with reference to FIG. 5. Referring to FIG. 5, the upper half part of FIG. 5 is an offset water wave effect picture. As the dynamic object continues to move backwards, a new water wave can continue to be injected. To create the lag sense of the water wave, for each newly injected water wave, all previous water waves need to be offset. Specifically referring to the lower half part of FIG. 5, first assuming that the dynamic object stands still, every time a water wave is injected, that is, the water wave before the injection is moved in a direction opposite to a movement direction of the dynamic object, and then the entire water wave map is moved in the movement direction of the dynamic object according to a location offset du of the dynamic object, to obtain the offset water wave effect picture shown in the upper half part of FIG. 5.

Based on this, when acquiring the water wave map and the normal map corresponding to the target water body region where the dynamic object is located in the current image frame, the terminal may acquire the water wave map and the normal map corresponding to the target water body region where the dynamic object is located in the next image frame according to the offset water wave map. Then, the terminal renders the water wave effect on the target water body region where the dynamic object is located in the next image frame based on the normal map corresponding to the target water body region where the dynamic object is located in the next image frame.

It can be seen from above that this embodiment of this disclosure provides an image rendering method. The method performs water surface rendering from two aspects of water wave injection and water wave spread and from the perspective of water wave formation. Specifically, the attenuation processing is performed on the water wave map corresponding to the target water body region where the dynamic object is located in the current image frame according to the water wave injection displacement and the water wave diffusion attenuation matrix corresponding to the dynamic object in a case that the dynamic object moves in the water, the entire attenuated water wave map is offset in the direction opposite to the movement direction of the dynamic object according to the location offset of the dynamic object, the normal map of the next image frame is acquired based on the offset water wave map, and then the water wave effect on the target water body region where the dynamic object is located in the next image frame is rendered according to the normal map corresponding to the target water body region where the dynamic object is located in the next image frame. Through iterative rendering frame by frame, a relatively realistic water wave animation effect can be simulated, and because only the target water body region where the dynamic object is located is processed, the complexity is lowered, and the calculation amount is reduced, to better adapt to a mobile terminal application.

Figure 6:
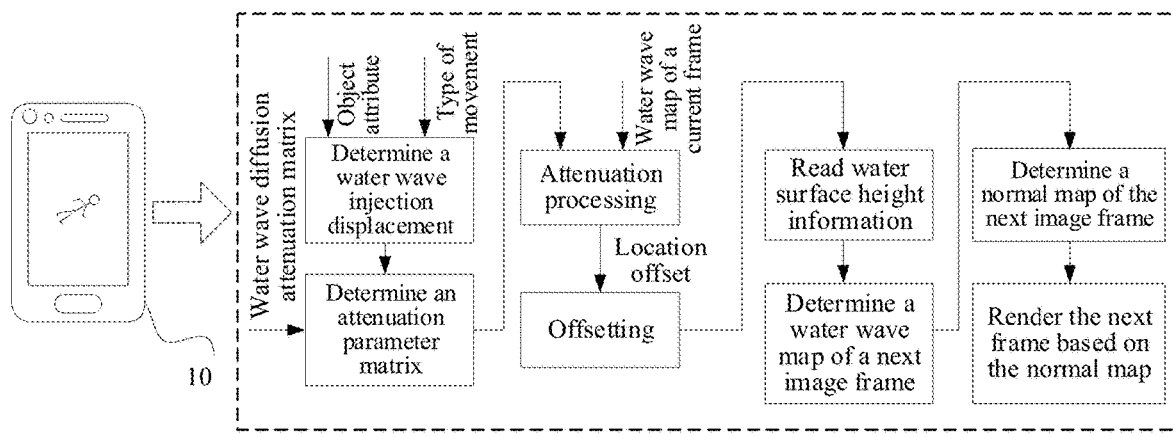
FIG. 6 is a schematic diagram of an disclosure scenario of an image rendering method according to an embodiment of this disclosure.

The following describes the image rendering method provided in embodiments of this disclosure with reference to a game application scenario. FIG. 6 is a schematic diagram of an application scenario of an image rendering method. The scenario includes a terminal 10, and the terminal 10 may be specifically a smart phone configured to perform water surface rendering on a mobile game.

Specifically, a game role object swims in water, and the water surface is disturbed to produce a water wave. The formation of the water wave includes two processes: water wave injection and water wave spread. The terminal 10 acquires a water wave injection displacement corresponding to the game role object according to an object attribute of the game role object and a movement that the game role object makes.

Next, the terminal 10 calculates a product of a pre-defined water wave diffusion attenuation matrix kernel used for describing a shape of the water wave and the water wave injection displacement acquired based on the object attribute and the movement made as an attenuation parameter matrix. In this embodiment, the attenuation parameter matrix is a 5*5 matrix. After acquiring a water wave map corresponding to a target water body region where the game role object is located in a current image frame, the terminal 10 superposes values in the attenuation parameter matrix to the water wave map. Assuming that a size of the water wave map is 25*15, during superposing, a center point of the attenuation parameter matrix is matched with a center point of the water wave map, rows and columns of the attenuation parameter matrix are zero-filled to make a size of the attenuation parameter matrix is the same as the size of the water wave map, and then values in the processed attenuation parameter matrix are superposed to the water wave map.

To create the lag sense of the water wave, the terminal 10 offsets the attenuated water wave map. Specifically, the terminal offsets the attenuated water wave map in a direction opposite to a movement direction of the game role object according to a location offset of the game role object to obtain an offset water wave map. In this embodiment, if the game role object is offset by 1 meter to the east, the terminal 10 offsets the entire attenuated water wave map by 1 meter to the west to obtain the offset water wave map.

Next, the terminal 10 reads water surface height information from the offset water wave map, the water surface height information including water surface height displacements respectively corresponding to the current image frame and a previous frame thereof; acquires, by using the water surface height information as a wave equation parameter, a water surface height displacement corresponding to the next image frame according to a wave equation with damping and the wave equation parameter; generates a water wave map corresponding to the target water body region where the game role object is located in the next image frame according to the water surface height displacement corresponding to the current image frame and the water surface height displacement corresponding to the next image frame; acquires water surface height displacement differences respectively between each water surface vertex and an upper vertex and a right vertex that are neighboring to the each water surface vertex in the next image frame according to the water wave map corresponding to the target water body region where the game role object is located in the next image frame; and acquires the normal map corresponding to the target water body region where the game role object is located in the next image frame according to the water surface height displacement differences.

A channel R and a channel G of the normal map respectively store the water surface height displacement difference between each water surface vertex and the neighboring upper vertex and the water surface height displacement difference between each water surface vertex and the neighboring right vertex in the next image frame. The water surface height displacement differences can represent an unevenness degree of the water surface, and the water wave effect on the target water body region where the game role object is located in the next image frame is rendered based on the normal map.

Figure 7:
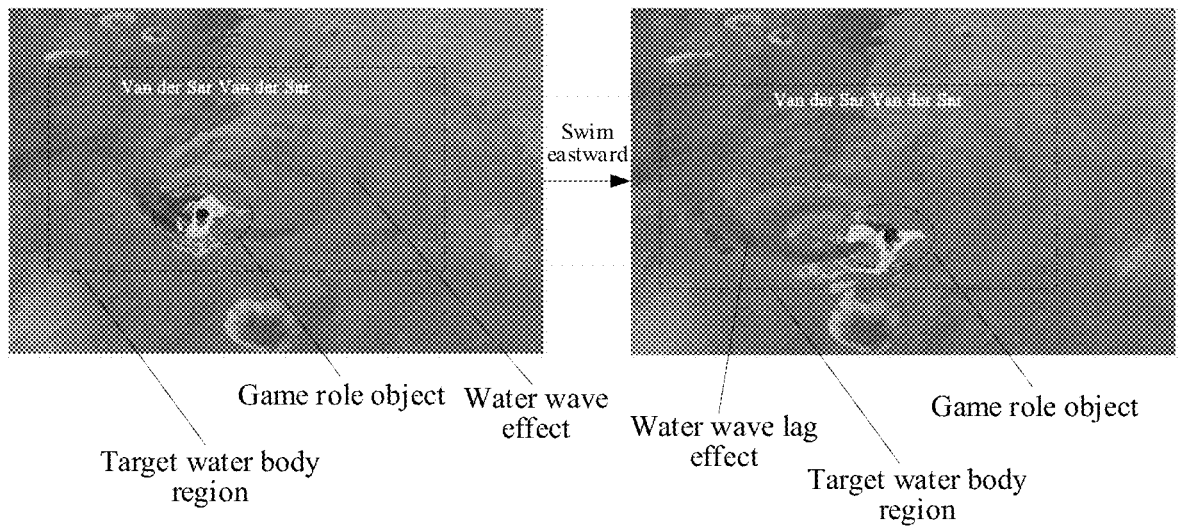
FIG. 7 is a schematic diagram of an effect of an image rendering method according to an embodiment of this disclosure.

In this embodiment, the terminal 10 may be configured to iteratively update a water wave map and a normal map of a next-but-one image frame according to the acquired water wave map of the next image frame. In this case, iterative rendering frame by frame can be implemented, so that a realistic water wave animation effect is simulated. Specifically, referring to FIG. 7, a game role object makes the movement of swimming eastward, the water surface is disturbed, a new water wave is injected, and the original water wave offsets a direction opposite to a movement direction of the game role object, that is, offsets westward, so as to form a water wave lag effect shown in the right panel of FIG. 7.

The foregoing descriptions are some specific implementations of the image rendering method provided in the embodiments of this disclosure. Based on this, an embodiment of this disclosure further provides an image rendering apparatus. The following describes the image rendering apparatus provided in this embodiment of this disclosure from a perspective of function modularization.

Figure 8:
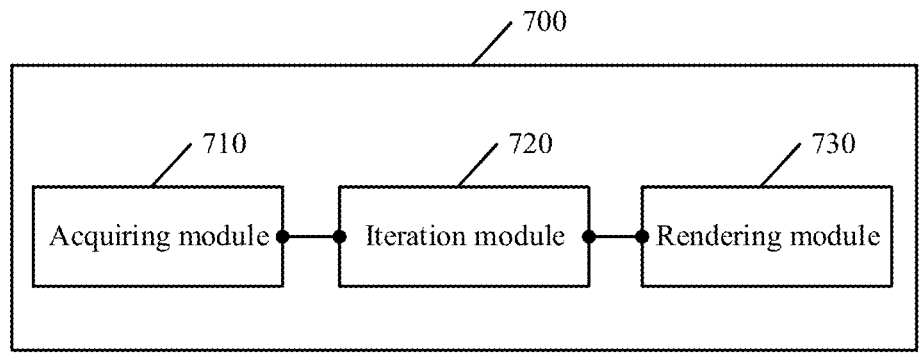
FIG. 8 is a schematic structural diagram of an image rendering apparatus according to an embodiment of this disclosure.

FIG. 8 is a schematic structural diagram of an image rendering apparatus. The apparatus 700 can include an acquiring module 710 that is configured to acquire a water wave map corresponding to a target water body region where a dynamic object is located in a current image frame. The apparatus 700 can further include an iteration module 720 that is configured to acquire a normal map corresponding to the target water body region where the dynamic object is located in a next image frame according to the water wave map corresponding to the target water body region where the dynamic object is located in the current image frame. Further, the apparatus can include a rendering module 730 that is configured to render a water wave effect on the target water body region where the dynamic object is located in the next image frame according to the normal map corresponding to the target water body region where the dynamic object is located in the next image frame. Of course, it should be understood that one or more of the modules described in this disclosure can be implemented by hardware, such as circuitry.

Figure 9:
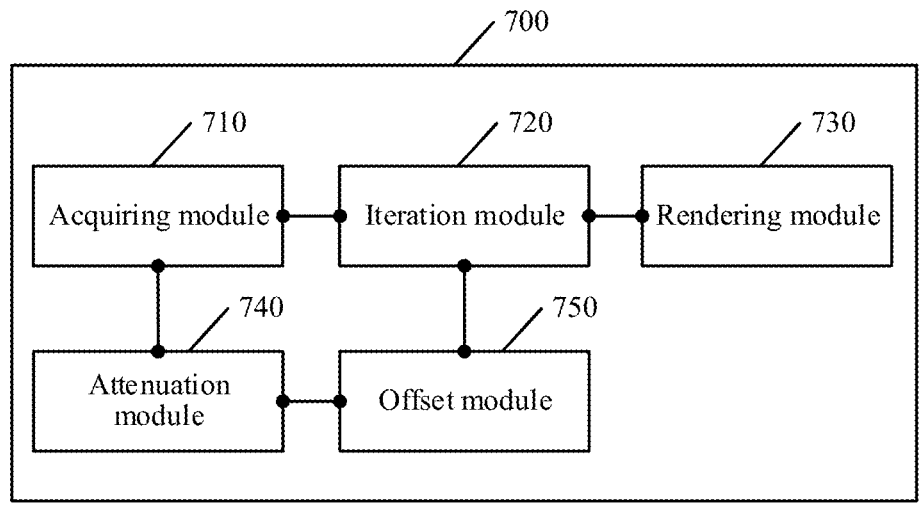
FIG. 9 is a schematic structural diagram of an image rendering apparatus according to an embodiment of this disclosure.

Optionally, FIG. 9 is a schematic structural diagram of an image rendering apparatus according to an embodiment of this disclosure. Based on the structure shown in FIG. 7, the apparatus 700 can further include an attenuation module 740 that is configured to perform attenuation processing on the water wave map corresponding to the target water body region where the dynamic object is located in the current image frame according to a water wave injection displacement and a water wave diffusion attenuation matrix corresponding to the dynamic object to obtain an attenuated water wave map in a case that the dynamic object moves in water. The apparatus can also include an offset module 750 that is configured to offset the attenuated water wave map in a direction opposite to a movement direction of the dynamic object according to a location offset of the dynamic object to obtain an offset water wave map. Further, the iteration module 720 can be specifically configured to acquire the normal map corresponding to the target water body region where the dynamic object is located in the next image frame according to the offset water wave map.

Figure 10:
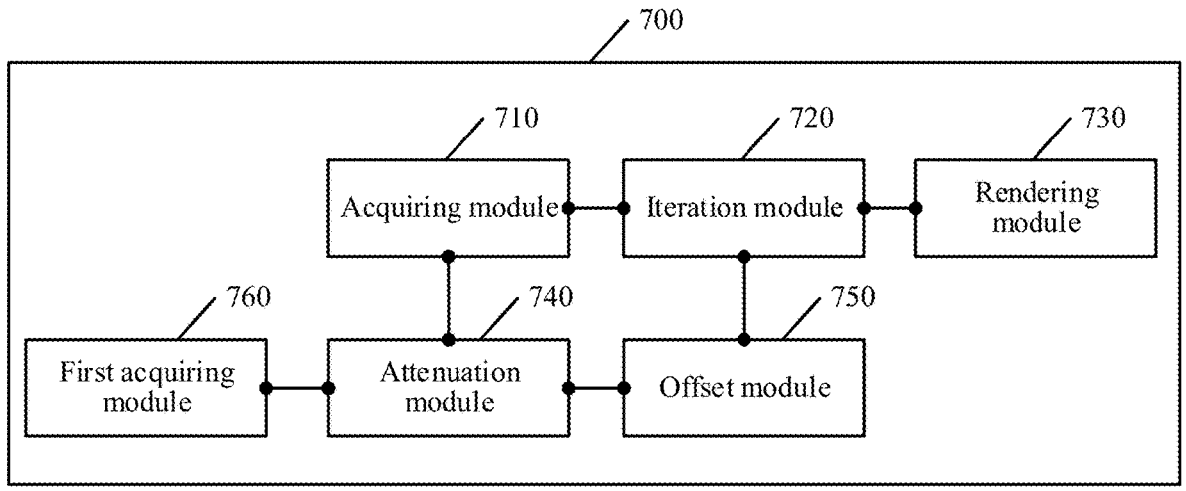
FIG. 10 is a schematic structural diagram of an image rendering apparatus according to an embodiment of this disclosure.

Optionally, FIG. 10 is a schematic structural diagram of an image rendering apparatus according to an embodiment of this disclosure. Based on the structure shown in FIG. 9, the apparatus 700 can further include a first acquiring module 760 that is configured to acquire the water wave injection displacement corresponding to the dynamic object according to at least one of an object attribute of the dynamic object or a type of movement that the dynamic object makes.

Optionally, the attenuation module 740 can be specifically configured to acquire a product of the water wave injection displacement and the water wave diffusion attenuation matrix corresponding to the dynamic object as an attenuation parameter matrix, and superpose values in the attenuation parameter matrix to the water wave map corresponding to the target water body region where the dynamic object is located in the current image frame to obtain an attenuated water wave map.

Figure 11:
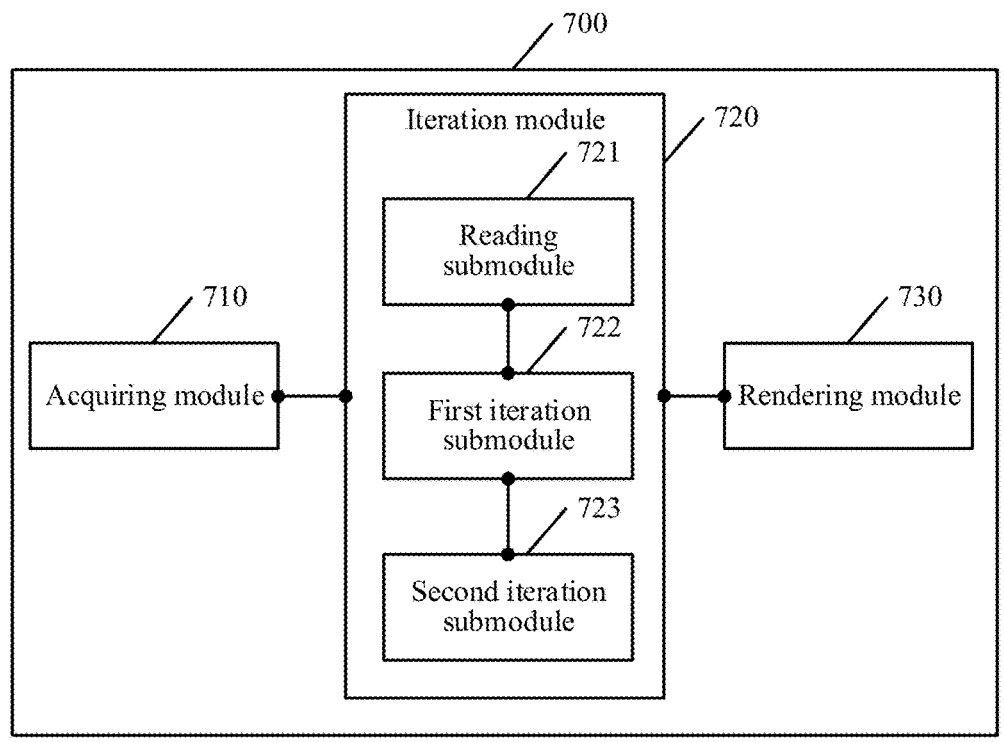
FIG. 11 is a schematic structural diagram of an image rendering apparatus according to an embodiment of this disclosure.

Optionally, FIG. 11 is a schematic structural diagram of an image rendering apparatus according to an embodiment of this disclosure. Based on the structure shown in FIG. 8, the iteration module 720 can include a reading submodule 721 that is configured to read water surface height information from the water wave map corresponding to the target water body region where the dynamic object is located in the current image frame, the water surface height information including water surface height displacements respectively corresponding to the current image frame and a previous frame thereof. The iteration module 720 can further include a first iteration submodule 722 that is configured to acquire a water wave map corresponding to the target water body region where the dynamic object is located in the next image frame according to the water surface height information. Additionally, the iteration module 720 can include a second iteration submodule 723 that is configured to acquire the normal map corresponding to the target water body region where the dynamic object is located in the next image frame according to the water wave map corresponding to the target water body region where the dynamic object is located in the next image frame.

The image rendering apparatus shown in FIG. 11 may also formed based on the structure shown in FIG. 9 or FIG. 10, which is not limited in this embodiment of this disclosure.

Optionally, the first iteration submodule 722 is specifically configured to acquire, by using the water surface height information as a wave equation parameter, a water surface height displacement corresponding to the next image frame according to a wave equation with damping and the wave equation parameter, and generate the water wave map corresponding to the target water body region where the dynamic object is located in the next image frame according to the water surface height displacement corresponding to the current image frame and the water surface height displacement corresponding to the next image frame.

Optionally, the second iteration submodule 723 is specifically configured to acquire water surface height displacement differences respectively between each water surface vertex and an upper vertex and a right vertex that are neighboring to the each water surface vertex in the next image frame according to the water wave map corresponding to the target water body region where the dynamic object is located in the next image frame, and acquire the normal map corresponding to the target water body region where the dynamic object is located in the next image frame according to the water surface height displacement differences. Alternatively, the second iteration submodule 723 is specifically configured to acquire water surface height displacement differences respectively between each water surface vertex and a left vertex and a lower vertex that are neighboring to the each water surface vertex in the next image frame according to the water wave map corresponding to the target water body region where the dynamic object is located in the next image frame, and acquire the normal map corresponding to the target water body region where the dynamic object is located in the next image frame according to the water surface height displacement differences.

Figure 12:
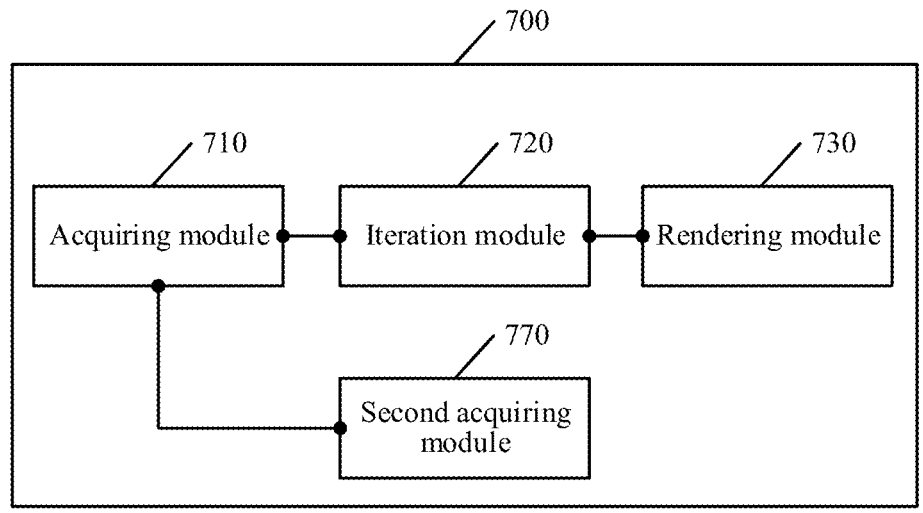
FIG. 12 is a schematic structural diagram of an image rendering apparatus according to an embodiment of this disclosure.

Optionally, FIG. 12 is a schematic structural diagram of an image rendering apparatus according to an embodiment of this disclosure. Based on the structure shown in FIG. 7, the apparatus 700 further includes a second acquiring module 770, configured to acquire an image location of the dynamic object in an image frame, and acquire the target water body region where the dynamic object is located in the image frame by using the image location as a central location of the target water body region where the dynamic object is located and using a preset width and height as a width and height of the target water body region.

The image rendering apparatus shown in FIG. 12 may also formed based on the structure shown in FIG. 9 or FIG. 10, which is not limited in this embodiment of this disclosure.

Optionally, the water wave map and the normal map use two color rendering map formats. Further, the image frame can include an image frame in a game application, and the dynamic object includes a game role object.

It can be seen from above that this embodiment of this disclosure provides an image rendering apparatus. The apparatus considers water wave spread motion condition, acquires a normal map corresponding to a target water body region where a dynamic object is located in a next image frame based on a water wave map corresponding to the target water body region where the dynamic object is located in a current image frame, and renders a water wave effect on the target water body region in the next image frame based on the normal map. On the one hand, through iterative rendering frame by frame, a realistic water wave animation effect can be simulated to make the water surface interaction very natural, providing users with immersive experience. On the other hand, because the water wave rendering is performed only on the target water body region, the complexity is lowered, and the calculation amount is reduced, to better adapt to a mobile terminal application.

The embodiments shown in FIG. 8 to FIG. 12 describes the image rendering apparatus from a perspective of function modularization. An embodiment of this disclosure further provides a processing device used for image rendering. The following describes the device provided in this embodiment of this disclosure from a perspective of hardware substantiation.

Figure 13:
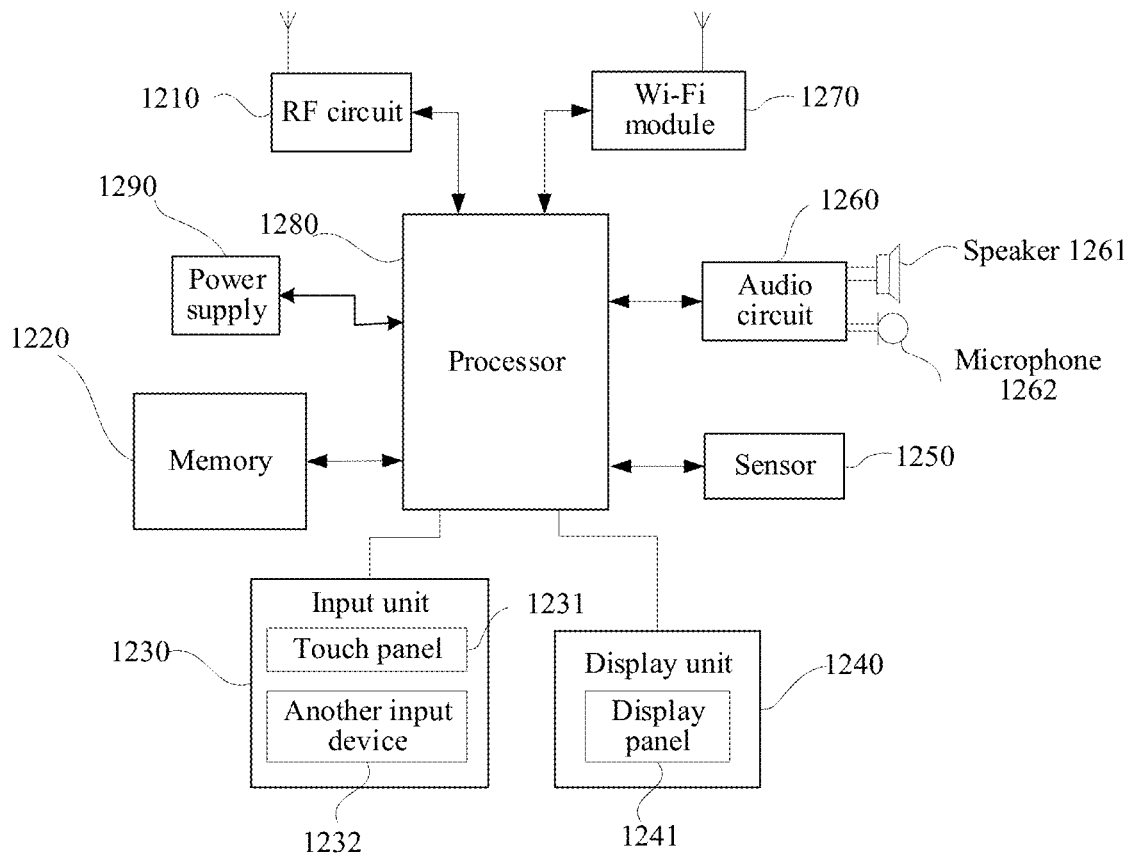
FIG. 13 is a schematic structural diagram of a processing device for image rendering according to an embodiment of this disclosure.

An embodiment of this disclosure further provides a processing device, the processing device may be a terminal or a server, and only a structure of the terminal is provided. As shown in FIG. 13, for ease of description, only parts related to this embodiment of this disclosure are shown. For specific technical details that are not disclosed, refer to the apparatus part of the embodiments of this disclosure. The terminal may be any terminal device such as a mobile phone, a tablet computer, a personal digital assistant (PDA), or an in-vehicle computer. An example in which the terminal is a mobile phone is used.

FIG. 13 is a block diagram of the structure of a part of a mobile phone related to a terminal according to an embodiment of this disclosure. Referring to FIG. 13, the mobile phone includes components such as a radio frequency (RF) circuit 1210, a memory 1220, an input unit 1230, a display unit 1240, a sensor 1250, an audio circuit 1260, a Wi-Fi module 1270, a processor 1280, and a power supply 1290. A person skilled in the art may understand that the structure of the mobile phone shown in FIG. 12 does not constitute a limitation on the mobile phone, and the mobile phone may include more components or fewer components than those shown in the figure, or some components may be combined, or a different component deployment may be used.

The following makes a specific description of components of the mobile phone with reference to FIG. 12. The RF circuit 1210 may be configured to receive and transmit signals during an information receiving and transmitting process or a call process. Specifically, the RF circuit receives downlink information from a base station, then delivers the downlink information to the processor 1280 for processing, and transmits designed uplink data to the base station. Generally, the RF circuit 1210 includes, but is not limited to, an antenna, at least one amplifier, a transceiver, a coupler, a low noise amplifier (LNA), a duplexer, and the like. In addition, the RF circuit 1210 may also communicate with a network and another device by wireless communication. The wireless communication may use any communication standard or protocol, which includes, but is not limited to, Global System for Mobile communication (GSM), General Packet Radio Service (GPRS), Code Division Multiple Access (CDMA), Wideband Code Division Multiple Access (WCDMA), Long Term Evolution (LTE), Email, Short Messaging Service (SMS), and the like.

The memory 1220 may be configured to store a software program and module. The processor 1280 runs the software program and module stored in the memory 1220, to implement various functional applications and data processing of the mobile phone. The memory 1220 may mainly include a program storage area and a data storage area. The program storage area may store an operating system, an application program required by at least one function (for example, a sound playback function and an image display function), and the like. The data storage area may store data (for example, audio data and an address book) created according to the use of the mobile phone, and the like. In addition, the memory 1220 may include a high speed random access memory, and may also include a non-volatile memory, for example, at least one magnetic disk storage device, a flash memory, or another volatile solid-state storage device.

The input unit 1230 may be configured to receive input digit or character information, and generate a keyboard signal input related to the user setting and function control of the mobile phone. Specifically, the input unit 1230 may include a touch panel 1231 and another input device 1232. The touch panel 1231, which may also be referred to as a touch screen, may collect a touch operation of a user on or near the touch panel 1231 (such as an operation of a user on the touch panel 1231 or near the touch panel 1231 by using any suitable object or accessory such as a finger or a stylus), and drive a corresponding connection apparatus according to a preset program. Optionally, the touch panel 1231 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and transmits the touch point coordinates to the processor 1280. Moreover, the touch controller can receive and execute a command transmitted from the processor 1280. In addition, the touch panel 1231 may be implemented by using various types, such as a resistive type, a capacitive type, an infrared type, and a surface acoustic wave type. In addition to the touch panel 1231, the input unit 1230 may further include the another input device 1232. Specifically, the another input device 1232 may include, but is not limited to, one or more of a physical keyboard, a functional key (for example, a volume control key or a switch key), a track ball, a mouse, and a joystick.

The display unit 1240 may be configured to display information inputted by the user or information provided for the user, and various menus of the mobile phone. The display unit 1240 may include a display panel 1241. Optionally, the display panel 1241 may be configured by using a liquid crystal display (LCD), an organic light-emitting diode (OLED), or the like. Further, the touch panel 1231 may cover the display panel 1241. After detecting a touch operation on or near the touch panel 1231, the touch panel 1231 transfers the touch operation to the processor 1280, to determine a type of a touch event. Then, the processor 1280 provides a corresponding visual output on the display panel 1241 according to the type of the touch event. Although in FIG. 12, the touch panel 1231 and the display panel 1241 are used as two separate parts to implement input and output functions of the mobile phone, in some embodiments, the touch panel 1231 and the display panel 1241 may be integrated to implement the input and output functions of the mobile phone.

The mobile phone may further include at least one sensor 1250 such as an optical sensor, a motion sensor, and other sensors. Specifically, the optical sensor may include an ambient light sensor and a proximity sensor. The ambient light sensor may adjust luminance of the display panel 1241 according to brightness of the ambient light. The proximity sensor may switch off the display panel 1241 and/or backlight when the mobile phone is moved to the ear. As one type of motion sensor, an acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 1260, a speaker 1261, and a microphone 1262 may provide audio interfaces between a user and the mobile phone. The audio circuit 1260 may convert received audio data into an electrical signal and transmit the electrical signal to the speaker 1261. The speaker 1261 converts the electrical signal into a sound signal for output. On the other hand, the microphone 1262 converts a collected sound signal into an electrical signal. The audio circuit 1260 receives the electrical signal, converts the electrical signal into audio data, and outputs the audio data to the processor 1280 for processing. Then, the processor transmits the audio data to, for example, another mobile phone by using the RF circuit 1210, or outputs the audio data to the memory 1220 for further processing.

Wi-Fi is a short distance wireless transmission technology. The mobile phone may help, by using the Wi-Fi module 1270, a user receive and transmit an email, browse a web page, access stream media, and the like. This provides wireless broadband Internet access for the user. Although FIG. 12 shows the Wi-Fi module 1270, it may be understood that the Wi-Fi module is not a necessary component of the mobile phone, and the Wi-Fi module may be omitted as required provided that the scope of the essence of the present disclosure is not changed.

The processor 1280 is a control center of the mobile phone, and is connected to various parts of the entire mobile phone by using various interfaces and lines. By running or executing a software program and/or module stored in the memory 1220, and invoking data stored in the memory 1220, the processor 1280 executes various functions of the mobile phone and performs data processing, thereby monitoring the entire mobile phone. Optionally, the processor 1280 may include one or more processing units. Preferably, the processor 1280 may integrate an application processor and a modem. The application processor mainly processes an operating system, a user interface, an APP, and the like. The modem mainly processes wireless communication. It may be understood that the modem may alternatively not be integrated into the processor 1280.

The mobile phone further includes the power supply 1290 (such as a battery) for supplying power to the components. Preferably, the power supply may be logically connected to the processor 1280 by using a power management system, thereby implementing functions such as charging, discharging, and power consumption management by using the power management system.

Although not shown in the figure, the mobile phone may further include a camera, a Bluetooth module, and the like, which are not further described herein.

In the embodiments of this disclosure, the processor 1280 included in the terminal further has the following functions of acquiring a water wave map corresponding to a target water body region where a dynamic object is located in a current image frame, acquiring a normal map corresponding to the target water body region where the dynamic object is located in a next image frame according to the water wave map corresponding to the target water body region where the dynamic object is located in the current image frame, and rendering a water wave effect on the target water body region where the dynamic object is located in the next image frame according to the normal map corresponding to the target water body region where the dynamic object is located in the next image frame.

Optionally, the processor 1280 is further configured to perform steps of any implementation of the image rendering method provided in the embodiments of this disclosure, and description is made below in detail.

Optionally, the processor 1280 is further configured to perform attenuation processing on the water wave map corresponding to the target water body region where the dynamic object is located in the current image frame according to a water wave injection displacement and a water wave diffusion attenuation matrix corresponding to the dynamic object to obtain an attenuated water wave map in a case that the dynamic object moves in water. Further, the processor can offset the attenuated water wave map in a direction opposite to a movement direction of the dynamic object according to a location offset of the dynamic object to obtain an offset water wave map, and acquire the normal map corresponding to the target water body region where the dynamic object is located in the next image frame according to the offset water wave map.

Optionally, the processor 1280 is further configured to acquire the water wave injection displacement corresponding to the dynamic object according to at least one of an object attribute of the dynamic object or a type of movement that the dynamic object makes. Further, the processor 1280 can be configured to acquire a product of the water wave injection displacement and the water wave diffusion attenuation matrix corresponding to the dynamic object as an attenuation parameter matrix, and superpose values in the attenuation parameter matrix to the water wave map corresponding to the target water body region where the dynamic object is located in the current image frame to obtain the attenuated water wave map.

Optionally, the processor 1280 is further configured to read water surface height information from the water wave map corresponding to the target water body region where the dynamic object is located in the current image frame, the water surface height information including water surface height displacements respectively corresponding to the current image frame and a previous frame thereof. Further, the processor can acquire a water wave map corresponding to the target water body region where the dynamic object is located in the next image frame according to the water surface height information, and acquire the normal map corresponding to the target water body region where the dynamic object is located in the next image frame according to the water wave map corresponding to the target water body region where the dynamic object is located in the next image frame.

Optionally, the processor 1280 is further configured to acquire, by using the water surface height information as a wave equation parameter, a water surface height displacement corresponding to the next image frame according to a wave equation with damping and the wave equation parameter, and generate the water wave map corresponding to the target water body region where the dynamic object is located in the next image frame according to the water surface height displacement corresponding to the current image frame and the water surface height displacement corresponding to the next image frame.

Optionally, the processor 1280 is further configured to acquire water surface height displacement differences respectively between each water surface vertex and an upper vertex and a right vertex that are neighboring to the each water surface vertex in the next image frame according to the water wave map corresponding to the target water body region where the dynamic object is located in the next image frame, and acquire the normal map corresponding to the target water body region where the dynamic object is located in the next image frame according to the water surface height displacement differences. Alternatively, the processor 1280 can acquire water surface height displacement differences respectively between each water surface vertex and a left vertex and a lower vertex that are neighboring to the each water surface vertex in the next image frame according to the water wave map corresponding to the target water body region where the dynamic object is located in the next image frame, and acquire the normal map corresponding to the target water body region where the dynamic object is located in the next image frame according to the water surface height displacement differences.

Optionally, the processor 1280 is further configured to acquire an image location of the dynamic object in an image frame, and acquire the target water body region where the dynamic object is located in the image frame by using the image location as a central location of the target water body region where the dynamic object is located and using a preset width and height as a width and height of the target water body region.

Optionally, the water wave map and the normal map use two color rendering map formats. Further, the image frame can include an image frame in a game application, and the dynamic object includes a game role object.

An embodiment of this disclosure further provides a non-transitory computer-readable storage medium that is configured to store program code that, when executed by a processor, can implement any implementation in the image rendering method described in the foregoing exemplary embodiments.

An embodiment of this disclosure further provides a computer program product including instructions that, when run on a computer, enabling the computer to perform any implementation in an image rendering method described in the foregoing exemplary embodiments.

Persons skilled in the art may clearly understand that, for the purpose of convenient and brief description, for a detailed working process of the system, apparatus, and unit described above, refer to a corresponding process in the apparatus embodiments, and details are not described herein again.

In the several embodiments provided in this disclosure, it is to be understood that the disclosed system, apparatus, and unit may be implemented in other manners. For example, the described apparatus embodiments are merely exemplary. For example, the unit division is merely logical function division and may be other division in actual implementation. For example, a plurality of units or components may be combined or integrated into another system, or some features may be ignored or skipped. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate parts may or may not be physically separate, and components displayed as units may or may not be physical units, that is, may be located in one position, or may be distributed on a plurality of network units. Some or all of the units can be selected according to actual requirements to achieve the objectives of the solutions in the embodiments.

In addition, functional units in the embodiments of this disclosure may be integrated into one processing unit, or each of the units can exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a non-transitory computer-readable storage medium. Based on such an understanding, the technical solutions of this disclosure essentially, or the part contributing to the related art, or all or a part of the technical solutions may be implemented in the form of a software product. The computer software product is stored in a storage medium and includes several instructions for instructing a computer device (which may be a PC, a server, or a network device) to perform all or some of the steps of the apparatus described in the embodiments of this disclosure. The foregoing storage medium includes: any medium that can store program code, such as a USB flash drive, a removable hard disk, a read-only memory (ROM), a random access memory (RAM), a magnetic disk, or an optical disc.

It is to be understood that in this disclosure, "at least one (item)" refers to one or more and "a plurality of" refers to two or more. "And/or" is used to describe an association between associated objects, and indicates that there may be three types of relationships. For example, "A and/or B" may indicate that only A exists, only B exists, and both A and B exist, where A and B may be singular or plural. The character "/" generally indicates an "or" relationship between the associated objects. "At least one of the following" or a similar expression thereof refers to any combination of these items, including one item or any combination of more items. For example, at least one of a, b, or c may indicate: a, b, c, "a and b", "a and c", "b and c", or "a, b, and c", where a, b, and c may be singular or plural.

The foregoing embodiments are merely intended for describing the technical solutions of this disclosure, but not for limiting this disclosure. Although this disclosure is described in detail with reference to the foregoing embodiments, it is to be understood for persons of ordinary skill in the art that they may still make modifications to the technical solutions described in the foregoing embodiments or make equivalent replacements to some technical features thereof, without departing from the spirit and scope of the technical solutions of the embodiments of this disclosure.

What is claimed is:

1. An image rendering method that is applicable to a processing device, the method comprising:
    acquiring a water wave map corresponding to a target water body region where a dynamic object is located in a current image frame;
    acquiring a normal map corresponding to the target water body region where the dynamic object is located in a next image frame based on the water wave map corresponding to the target water body region where the dynamic object is located in the current image frame;
    rendering a water wave effect on the target water body region where the dynamic object is located in the next image frame based on the normal map corresponding to the target water body region where the dynamic object is located in the next image frame; and
    performing attenuation processing on the water wave map corresponding to the target water body region where the dynamic object is located in the current image frame based on a water wave injection displacement and a water wave diffusion attenuation matrix corresponding to the dynamic object to obtain an attenuated water wave map when the dynamic object moves in water;
    wherein the water wave injection displacement corresponding to the dynamic object is acquired by acquiring the water wave injection displacement corresponding to an object attribute of the dynamic object, wherein the object attribute being a characteristic of the dynamic object.

2. The method according to claim 1, further comprising:
    offsetting the attenuated water wave map in a direction opposite to a movement direction of the dynamic object according to a location offset of the dynamic object to obtain an offset water wave map,
    wherein the acquiring the normal map corresponding to the target water body region where the dynamic object is located in a next image frame based on the water wave map corresponding to the target water body region where the dynamic object is located in the current image frame further includes acquiring the normal map corresponding to the target water body region where the dynamic object is located in the next image frame based on the offset water wave map.

3. The method according to claim 2, wherein the water wave injection displacement corresponding to the dynamic object is acquired by acquiring the water wave injection displacement corresponding to the dynamic object further based on
    a type of movement that the dynamic object makes, and
    wherein the characteristic is a gender or a weight of the dynamic object.

4. The method according to claim 2, wherein the performing attenuation processing on the water wave map further comprises:
    acquiring a product of the water wave injection displacement and the water wave diffusion attenuation matrix corresponding to the dynamic object as an attenuation parameter matrix; and
    superposing values in the attenuation parameter matrix to the water wave map corresponding to the target water body region where the dynamic object is located in the current image frame to obtain the attenuated water wave map.

5. The method according to claim 1, wherein the acquiring the normal map further comprises:
    reading water surface height information from the water wave map corresponding to the target water body region where the dynamic object is located in the current image frame, the water surface height information including water surface height displacements respectively corresponding to the current image frame and a previous image frame thereof;
    acquiring a water wave map corresponding to the target water body region where the dynamic object is located in the next image frame based on the water surface height information; and
    acquiring the normal map corresponding to the target water body region where the dynamic object is located in the next image frame based on the water wave map corresponding to the target water body region where the dynamic object is located in the next image frame.

6. The method according to claim 5, wherein the acquiring a water wave map corresponding to the target water body region further comprises:
    acquiring, by using the water surface height information as a wave equation parameter, a water surface height displacement corresponding to the next image frame based on a wave equation with damping and the wave equation parameter; and
    generating the water wave map corresponding to the target water body region where the dynamic object is located in the next image frame based on the water surface height displacement corresponding to the current image frame and the water surface height displacement corresponding to the next image frame.

7. The method according to claim 5, wherein the acquiring the normal map corresponding to the target water body region further comprises:
acquiring water surface height displacement differences respectively between each water surface vertex, and an upper vertex and a right vertex that are neighboring to the each water surface vertex in the next image frame according to the water wave map corresponding to the target water body region where the dynamic object is located in the next image frame, and acquiring the normal map corresponding to the target water body region where the dynamic object is located in the next image frame according to the water surface height displacement differences; or
acquiring water surface height displacement differences respectively between each water surface vertex, and a left vertex and a lower vertex that are neighboring to the each water surface vertex in the next image frame according to the water wave map corresponding to the target water body region where the dynamic object is located in the next image frame, and acquiring the normal map corresponding to the target water body region where the dynamic object is located in the next image frame according to the water surface height displacement differences.

8. The method according to claim 1, wherein the target water body region where the dynamic object is located in a frame is acquired by:
acquiring an image location of the dynamic object in an image frame, and acquiring the target water body region where the dynamic object is located in the image frame by using the image location as a central location of the target water body region where the dynamic object is located and using a preset width and height as a width and height of the target water body region.

9. The method according to claim 1, wherein the water wave map and the normal map use two color rendering map formats.

10. The method according to claim 1, wherein the current image frame is an image frame in a game application and the dynamic object is a game role object.

11. A processing device, comprising:
a processor; and
a memory that is configured to store program code and transmit the program code to the processor,
the processor being configured to:
acquire a water wave map corresponding to a target water body region where a dynamic object is located in a current image frame;
acquire a normal map corresponding to the target water body region where the dynamic object is located in a next image frame based on the water wave map corresponding to the target water body region where the dynamic object is located in the current image frame;
render a water wave effect on the target water body region where the dynamic object is located in the next image frame based on the normal map corresponding to the target water body region where the dynamic object is located in the next image frame; and
perform attenuation processing on the water wave map corresponding to the target water body region where the dynamic object is located in the current image frame based on a water wave injection displacement and a water wave diffusion attenuation matrix corresponding to the dynamic object to obtain an attenuated water wave map when the dynamic object moves in water,
wherein the water wave injection displacement corresponding to the dynamic object is acquired by acquiring the water wave injection displacement corresponding to an object attribute of the dynamic object, wherein the object attribute being a characteristic of the dynamic object.

12. The device according to claim 11, wherein the processor is further configured to:
offset the attenuated water wave map in a direction opposite to a movement direction of the dynamic object based on a location offset of the dynamic object to obtain an offset water wave map; and
acquire the normal map corresponding to the target water body region where the dynamic object is located in the next image frame according to the offset water wave map.

13. The device according to claim 12, wherein the processor is further configured to acquire the water wave injection displacement corresponding to the dynamic object further based on a type of movement that the dynamic object makes, and wherein the characteristic is a gender or a weight of the dynamic object.

14. The device according to claim 12, wherein the processor is further configured to:
acquire a product of the water wave injection displacement and the water wave diffusion attenuation matrix corresponding to the dynamic object as an attenuation parameter matrix; and
superpose values in the attenuation parameter matrix to the water wave map corresponding to the target water body region where the dynamic object is located in the current image frame to obtain the attenuated water wave map.

15. The device according to claim 11, wherein the processor is further configured to:
read water surface height information from the water wave map corresponding to the target water body region where the dynamic object is located in the current image frame, the water surface height information including water surface height displacements respectively corresponding to the current image frame and a previous image frame thereof;
acquire a water wave map corresponding to the target water body region where the dynamic object is located in the next image frame based on the water surface height information; and
acquire the normal map corresponding to the target water body region where the dynamic object is located in the next image frame based on the water wave map corresponding to the target water body region where the dynamic object is located in the next image frame.

16. The device according to claim 15, wherein the processor is further configured to:
acquire, by using the water surface height information as a wave equation parameter, a water surface height displacement corresponding to the next image frame based on a wave equation with damping and the wave equation parameter; and
generate the water wave map corresponding to the target water body region where the dynamic object is located in the next image frame based on the water surface height displacement corresponding to the current image frame and the water surface height displacement corresponding to the next image frame.

17. The device according to claim 15, wherein the processor is further configured to:
- acquire water surface height displacement differences respectively between each water surface vertex, and an upper vertex and a right vertex that are neighboring to the each water surface vertex in the next image frame based on the water wave map corresponding to the target water body region where the dynamic object is located in the next image frame, and acquire the normal map corresponding to the target water body region where the dynamic object is located in the next image frame based on the water surface height displacement differences; or
- acquire water surface height displacement differences respectively between each water surface vertex, and a left vertex and a lower vertex that are neighboring to the each water surface vertex in the next image frame based on the water wave map corresponding to the target water body region where the dynamic object is located in the next image frame, and acquire the normal map corresponding to the target water body region where the dynamic object is located in the next image frame based on the water surface height displacement differences.

18. The device according to claim 11, wherein the processor is further configured to:
- acquire an image location of the dynamic object in an image frame, and acquire the target water body region where the dynamic object is located in the image frame by using the image location as a central location of the target water body region where the dynamic object is located and using a preset width and height as a width and height of the target water body region.

19. The device according to claim 11, wherein the water wave map and the normal map use two color rendering map formats.

20. A non-transitory computer-readable storage medium that is configured to store program code that, when executed by a processor, causes the processor to implement operations comprising:
- acquiring a water wave map corresponding to a target water body region where a dynamic object is located in a current image frame;
- acquiring a normal map corresponding to the target water body region where the dynamic object is located in a next image frame based on the water wave map corresponding to the target water body region where the dynamic object is located in the current image frame;
- rendering a water wave effect on the target water body region where the dynamic object is located in the next image frame based on the normal map corresponding to the target water body region where the dynamic object is located in the next image frame; and
- performing attenuation processing on the water wave map corresponding to the target water body region where the dynamic object is located in the current image frame based on a water wave injection displacement and a water wave diffusion attenuation matrix corresponding to the dynamic object to obtain an attenuated water wave map when the dynamic object moves in water;
- wherein the water wave injection displacement corresponding to the dynamic object is acquired by acquiring the water wave injection displacement corresponding to an object attribute of the dynamic object, wherein the object attribute being a characteristic of the dynamic object.

* * * * *